United States Patent [19]

Leschke et al.

[11] Patent Number: 4,772,066
[45] Date of Patent: Sep. 20, 1988

[54] WATER DIVERSION DEVICE FOR VEHICLE WINDOW

[75] Inventors: Harald Leschke, Sindelfingen; Peter Pfeiffer, Böblingen, both of Fed. Rep. of Germany

[73] Assignee: Daimler-Benz Aktiengesellschaft, Stuttgart, Fed. Rep. of Germany

[21] Appl. No.: 105,567

[22] Filed: Oct. 8, 1987

[30] Foreign Application Priority Data

Oct. 8, 1986 [DE] Fed. Rep. of Germany ....... 3634296

[51] Int. Cl.⁴ ............................................... B60J 1/20
[52] U.S. Cl. .................................... 296/208; 296/213; 296/180.1
[58] Field of Search ................. 296/1 S, 208, 154, 213

[56] References Cited

U.S. PATENT DOCUMENTS 4,541,664  9/1985  Gallitzendorfer et al. ......... 296/213

FOREIGN PATENT DOCUMENTS 734711  3/1943  Fed. Rep. of Germany ...... 296/1 S
2409364 12/1975  Fed. Rep. of Germany .

Primary Examiner—Dennis H. Pedder
Attorney, Agent, or Firm—Barnes & Thornburg

[57] ABSTRACT

A water diversion device is provided for directing dirty water from a vehicle window. A dirty water channel extends along an A-frame surrounding a vehicle windshield. The water diversion device includes a profile member extending toward the channel in an upwardly inclined direction. Guide webs hold the profile member in position and are also inclined to guide the water flow to the channel.

4 Claims, 1 Drawing Sheet

WATER DIVERSION DEVICE FOR VEHICLE WINDOW

BACKGROUND AND SUMMARY OF THE INVENTION

The invention relates to a device for drawing off dirty water from a window of a vehicle, in particular a motor vehicle, in which, at a distance from the surface of the window edge, a guide strip defines a dirty water channel which is covered by an air-deflection profile up to the gaps arranged parallel to the dirty water channel at the longitudinal sides of the air-deflection profile.

German Published Patent Application (DE AS) No. 2,409,364 discloses a device of this type. Here, a water passage diaphragm for drawing off the dirty water from the windscreen is provided on the A-column of a motor vehicle. For this purpose, the water passage diaphragm forms a dirty water channel by means of a guide strip. So that water that has collected in the dirty water channel is not sprayed back again onto the windscreen by the air flow, air-deflection bands are proved in the dirty water channel between which the water can pass through, but the air flow is deflected. However, the air resistance of the water passage diaphragm is only marginally changed by these air-deflection bands. The poor aerodynamic properties of the water passage diaphragm essentially remain on account of the large gap between the windscreen and the guide strip.

An object of the invention is to supply a device for drawing off dirty water, which device has the best possible aerodynamic properties.

This object is achieved in a device of the type mentioned above by arranging the air-deflection profile, outside the dirty water channel, to extend from the surface of the window at an acute angle in the direction of the guide strip into the area of the dirty water channel.

The gap causing a high air resistance is consequently reduced. The aerodynamic properties of the water passage diaphragm are subsequently improved. The water delivered to the dirty water channel is reliably prevented from spraying back onto the window.

In a further development of preferred embodiments of the device according to the invention, the air-deflection profile is fixed on the window via baffle webs which project approximately perpendicularly from the window and serve to direct the dirty water towards the dirty water channel. By means of the baffle webs, the delivery of the dirty water from the window to the dirty water channel is improved. At the same time, it is contemplated to attach the air-deflection profile to the baffle webs. In especially preferred embodiments, it is expedient to make the baffle webs and the air-deflection profile in one piece. In this case, it is possible in a simple manner to adhesively bond the air-deflection profile, together with the baffle webs, to the windscreen, for example during subsequent fitting.

Other objects, advantages and novel features of the present invention will become apparent from the following detailed description of the invention when considered in conjunction with the accompanying drawings.

DETAILED DESCRIPTION OF THE DRAWINGS

Figure 1:
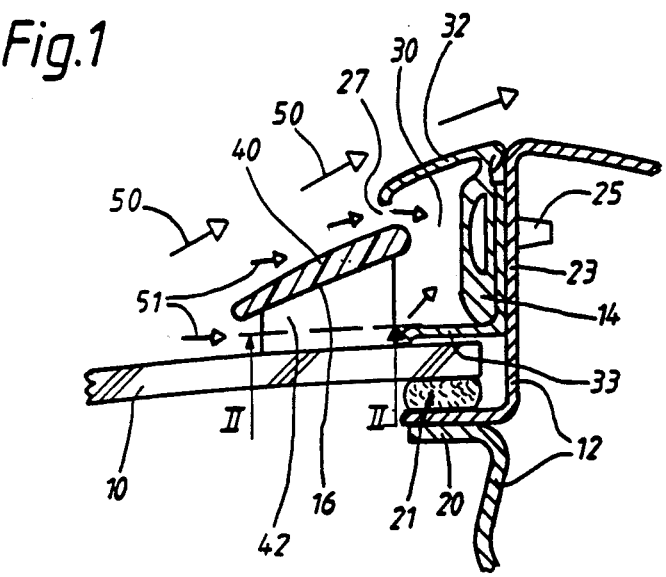
FIG. 1 is a schematic partial cross-sectional view through an A-column of a motor vehicle with a water passage diaphragm, forming a dirty water channel, and an additional air-deflection profile along the place I—I in FIG. 2 arranged in accordance with a preferred embodiment of the invention.

In FIG. 1, an A-column 12 of a motor vehicle is shown in cross section. This A-column 12 is provided with a flange 20 on which a windscreen is held by means of an adhesive bead 21. Moreover, the A-column 12 has an area 23 which is arranged approximately perpendicularly to the flange 20 and thus likewise perpendicularly to the windscreen 10. With this area 23, the A-column 12 projects beyond the plane formed by the windscreen 10.

A water passage diaphragm 14 is held on the area 23 of the A-column 12 by means of a catch element 25 or the like. This water passage diaphragm 14 is provided with a guide strip 32 and a sealing strip 33 which project approximately perpendicularly from the area 23 of the A-column 12 and are arranged approximately parallel to the windscreen 10. The guide strip 32, together with the sealing strip 33 and the windscreen 10, forms a dirty water channel 30 which, at the surface of the windscreen 10, runs approximately parallel to the A-column 12. Moreover, the sealing strip 33 essentially prevents water from penetrating the adhesive bead 21.

By means of the dirty water channel 30, water which has accumulated on the windscreen 10 and which has possibly been wiped aside by the windscreen wipers is collected and drawn off. The dirty water channel 30 directs the water collected to the roof of the motor vehicle, where it is drained off via appropriate recesses or drip mouldings or the like. In this way, dirtying of the side windows of the motor vehicle by the dirty water accumulating on the windscreen is prevented.

Apart from the water passage diaphragm 14, an auxiliary water passage diaphragm 16 is provided according to FIG. 1. This is provided with an air-deflection profile 40 and with baffle webs 42, 43.

The air-deflection profile 40 runs approximately parallel next to the dirty water channel 30. Transversely to its longitudinal direction, the air-deflection profile 40 extends approximately from the surface of the windscreen 10 up to the guide strip 32 of the water passage diaphragm 14. On the side remote from the dirty water channel 30, the air-deflection profile 40 is arranged at a distance from the surface of the windscreen 10. Starting at this side, the air-deflection profile 40 is inclined at an acute angle to the surface of the windscreen 10, which angle opens towards the guide strip 32. On it side facing the dirty water channel 30, the air-deflection profile 40 extends into the area of the dirty water channel 30 and is arranged on the side of the guide strip 32 facing the windscreen 10. Overall, the air-deflection profile 40 represents an extension of the guide strip 32 in the direction of the windscreen 10. As shown in FIG. 1, the guide strip 32 extends slightly to the left beyond the right end of profile 40.

Figure 2:
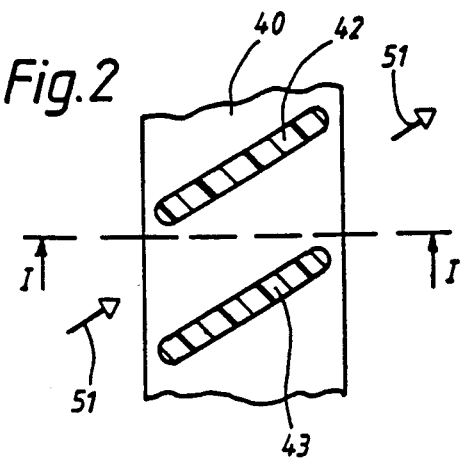
FIG. 2 is a sectional view through the air-deflection profile along the plane II—II in FIG. 1.

As FIGS. 1 and 2 reveal, the baffle webs 42, 43 project approximately perpendicularly from the windscreen 10. Moreover, according to FIG. 2, the baffle webs 42, 43 form an angle with the longitudinal direction of the air-deflection profile 40. The height of the baffle webs 42, 43 corresponds to the distance of the air-deflection profile 40 from the windscreen 10. The air-deflection profile 40 and the baffle webs 42, 43 are made in one piece and are adhesively bonded onto the windscreen 10.

The baffle webs 42, 43 are used for directing the dirty water from the windscreen 10 to the dirty water channel 30. The angle which the baffle webs 42, 43 occupy with the longitudinal direction of the air-deflection profile 40 is selected in such a way that it corresponds to the flow direction of the water at the respective corresponding point of the windscreen 10.

In FIG. 1, the air flow flowing past the water passage diaphragm 14 and the auxiliary water passage diaphragm 16 is indicated by means of arrows 50. By the extension, already mentioned, of the guide strip 32 by the air-deflection profile 40 to the windscreen 10, the aerodynamic properties of the entire device are substantially improved. The air-deflection profile 40 and the guide strip 32 form for the air flow a surface which runs essentially uniformly and along which the air flow can flow in accordance with the arrows 50.

Indicated by means of arrows 51 in FIGS. 1 and 2 is the flow direction of dirty water which is wiped to the side from the windscreen 10, for example by means of windscreen wipers, and thus towards the A-column 12 and which is then collected in the dirty water channel 30 and drawn off from the latter. As FIG. 1 reveals, the dirty water flows along on both the side facing the windscreen 10 and the side of the air-deflection profile 40 remote from the windscreen 10 towards the dirty water channel 30. For this purpose, a gap 27 of sufficient size is left open between the air-deflection profile 40 and the guide strip 32. The air deflection profile reliably prevents the water collected in the dirty water channel 30 from spraying out. By a corresponding arrangement of the baffle webs 42, 43 in the flow direction of the dirty water, the dirty water reaches the dirty water channel unimpeded.

By means of the auxiliary water passage diaphragm 16, the air resistance of the entire device arranged in the area of the A-column 12 of the motor vehicle is substantially reduced overall, with at the same time the water-collecting properties of the device being improved and collected water being prevented from spraying out of the device.

The auxiliary water passage diaphragm consisting of the air-deflection profile and baffle webs can expediently be made in one piece of plastic. Then, for example for subsequent fitting, it can be adhesively bonded onto the windscreen. Likewise, it is contemplated for the auxiliary water passage diaphragm to form a construction unit with the water passage diaphragm and thus be attached in one assembly operation during the production of the motor vehicle. Of course, the auxiliary water passage diaphragm can also be clipped onto the water passage diaphragm and/or the A-column by means of appropriate catch elements.

The device according to the invention for drawing off dirty water has been described above in connection with the windscreen of a motor vehicle. The device according to the invention, appropriately adapted, can of course also be used, as in general with windows of a vehicle, with other windows of a motor vehicle.

Although the present invention has been described and illustrated in detail, it is to be clearly understood that the same is by way of illustration and example only, and is not to be taken by way of limitation. The spirit and scope of the present invention are to be limited only by he terms of the appended claims.

What is claimed:

1. A device for drawing off water from a window of a vehicle, in which, at a distance from a window edge, a guide strip defines a water channel with an opening and an air deflection profile being disposed in a fixed position with respect to the window surface, said profile extending along the guide strip and window surface along its longitudinal extent and extending at an acute angle to said window surface along its transverse extent with portions of said profile in engagement with said window surface, said profile defining at opposite transverse edges gaps between the guide strip and window surface, respectively whereby water may be drawn into said guide strip by way of said gaps.

2. Device according to claim 1, wherein the air-deflection profile is fixed on the window via baffle webs which project approximately perpendicularly from the window and serve to direct the water towards the water channel.

3. Device according to claim 2, wherein the baffle webs and the air-deflection profile are made in one piece.

4. Device according to claim 3, wherein the baffle webs and the air-deflection profile are made of plastic and are adapted to be secured by adhesive directly to the window.

* * * * *